United States Patent [19]

Williams

[11] Patent Number: 4,575,828
[45] Date of Patent: Mar. 11, 1986

[54] METHOD FOR DISTINGUISHING BETWEEN TOTAL FORMATION PERMEABILITY AND FRACTURE PERMEABILITY

[75] Inventor: D. Michael Williams, Grapevine, Tex.

[73] Assignee: Mobil Oil Corporation, New York, N.Y.

[21] Appl. No.: 629,147

[22] Filed: Jul. 9, 1984

[51] Int. Cl.[4] .............................................. G01V 1/00
[52] U.S. Cl. ........................................ 367/31; 367/75
[58] Field of Search ................. 367/30, 31, 32, 33, 367/35, 75, 166; 364/421; 181/104, 106; 73/38

[56] References Cited

U.S. PATENT DOCUMENTS

| Re. 24,446 | 3/1958 | Summers | 89/26 X |
|---|---|---|---|
| 3,333,238 | 7/1967 | Caldwell | 340/860 |
| 3,362,011 | 1/1968 | Zemanek, Jr. | 340/860 |
| 3,369,626 | 2/1968 | Zemanek, Jr. | 367/33 |
| 3,839,899 | 10/1974 | McMillen | 73/38 |
| 3,900,826 | 8/1975 | Dowling et al. | 367/31 |
| 3,962,674 | 6/1976 | Howell | 367/30 |
| 4,131,875 | 12/1976 | Ingram | 367/35 |
| 4,178,577 | 12/1979 | Cini et al. | 367/166 |
| 4,383,308 | 5/1983 | Caldwell | 367/31 |
| 4,432,077 | 2/1984 | Alhilali et al. | 367/31 |

FOREIGN PATENT DOCUMENTS 1152201 8/1980 Canada .

OTHER PUBLICATIONS

C. F. Huang et al., The Correlation of Tube "Wave Events" With Open Fractures, Geological Survey of Canada, Paper 81-1A, pp. 361-376, 1981.

B. A. Hardaye, Examination of Tube Wave Noise in Verticle Seismic Profiling, Geophysics (Jun. 1981), pp. 892-903.

J. H. Rosenbaum, Synthetic Microseismograms: Logging in Porous Formations, Geophysics, vol. 39, No. 1 (Feb. 1974) pp. 14-32.

J. J. Stahl and J. D. Robinson, "Permeability Profiles from Acoustic Logging", 52nd Annual Fall Tech. Conf., Petroleum Engin. of AIME, (Oct. 1977) pp. 1-4.

"A New Method of Shear-Wave Logging", *Geophysics*, vol. 45, No. 10 (Oct. 1980), pp. 1489-1506, by Choro Kitsunezaki.

*Primary Examiner*—Charles T. Jordan
*Assistant Examiner*—Brian S. Steinberger
*Attorney, Agent, or Firm*—A. J. McKillop; Michael G. Gilman; George W. Hager, Jr.

[57] ABSTRACT

A borehole logging tool traverses a subsurface formation known to contain naturally occurring fractures. Acoustic wave energy through the naturally fractured formations is measured by a pair of spaced-apart receivers in the logging tool. The ratio of the tube wave amplitudes measured by the pair of receivers identifies total formation permeability. The differences in the tube wave travel times measured by the pair of receivers identifies matrix permeability. The difference between total formation permeability and matrix permeability is attributable to the naturally occurring fractures in the formation.

11 Claims, 9 Drawing Figures

METHOD FOR DISTINGUISHING BETWEEN TOTAL FORMATION PERMEABILITY AND FRACTURE PERMEABILITY

BACKGROUND OF THE INVENTION

The present invention relates in general to a method for acoustic well logging and, more particularly, to a method for distinguishing between total subsurface formation permeability and that portion of such total subsurface formation permeability that can be attributed to naturally occurring fractures in the subsurface formation.

It is well known that measurements of the conductivity and porosity of a formation are important in determining whether hydrocarbons are located therein, the hydrocarbon being found as non-conductive fluids in porous rock formations. It is also well known that hydrocarbons are generally not extractable from porous rock formations unless those formations are also permeable. At the present time, no apparatus is known for accurately measuring the permeability of a rock formation in-situ. Accordingly, after hydrocarbons are detected, it has been generally necessary to obtain a side wall core of a given formation in order to measure permeability in the laboratory. Such a technique is time consuming and unduly expensive.

Techniques of acoustic well-logging are also well known and the possible applicability of such techniques to the determination of the permeability of a formation was predicted by Rosenbaum in the article "Synthetic Microseismograms: Logging In Porous Formations", *Geophysics,* Volume 39, No. 1 (February 1974). Rosenbaum investigated numerically the ideal case of a borehole filled with an inviscid fluid surrounded by a formation that is porous and which conforms to Biot's theory. His investigation showed that the effect of the pore-fluid mobility on the calculated response is large and can be measured with an appropriate acoustic or sonic logging tool. He further predicted that the relative amplitude of a tube wave obtained from a sonic tool with a wide band frequency response would depend upon the permeability of the formation.

Reacting to the predictions of Rosenbaum, at least one attempt has been made to employ standard sonic logging tools for the determination of permeability. In a paper entitled "Permeability Profiles From Acoustic Logging", by J. J. Staal and J. D. Robinson, presented to the 52nd Annual Fall Technical Conference and Exhibition of the Society of Petroleum Engineers of A.I.M.I. held in Denver, Colo., Oct. 9–12, 1977, it was reported that with a standard Schlumberger sonic probe having transmitter-receiver spacing of up to 5 feet, a correlation could be detected between permeability and tube wave attenuation.

While standard sonic logging tools are available for permeability determination, a need still exists for improved techniques for permeability determination.

SUMMARY OF THE INVENTION

In accordance with the present invention, there is provided a method for distinguishing between total subsurface formation permeability and that portion of such permeability that is attributable to naturally occurring fractures in subsurface formations adjacent a borehole. The location of at least one naturally fractured formation adjacent a borehole is identified. The borehole is traversed with an acoustic logging tool. The amplitude and travel time relationships of tube waves detected by a pair of spaced apart receivers within the logging tool are recorded as the tool traverses at least along the identified location of the naturally fractured formation. Total permeability of the naturally fractured formation is estimated in accordance with a predetermined correlation between permeability and the recorded tube wave amplitude relationship. Matrix permeability of the naturally fractured formation is estimated in accordance with a predetermined correlation between permeability and the recorded tube wave travel time relationship. That portion of the estimated total formation permeability that is attributable to the naturally occurring fractures in the formation is identified by the difference between such estimated total formation permeability and said estimated matrix permeability.

In a further aspect, the recording of the amplitude relationship between tube waves detected by the pair of spaced-apart receivers includes the recording of the ratio of the tube wave amplitudes and the recording of the travel time relationship between the pair of spaced-apart receivers includes the recording of the difference of the tube wave travel times. Total formation permeability is estimated from a predetermined correlation established between recordings of permeability taken from core samples adjacent a naturally fractured formation in a select borehole and the ratio of tube wave amplitudes measured across the naturally occurring fractures by a pair of spaced-apart receivers in such select borehole. Matrix permeability is estimated from a predetermined correlation established between recordings of permeability taken from core samples adjacent a naturally fractured formation in a select borehole and the difference of the tube wave travel times across the naturally occurring fractures by a pair of spaced-apart receivers in such select borehole.

DESCRIPTION OF THE PREFERRED EMBODIMENT

Figure 1:
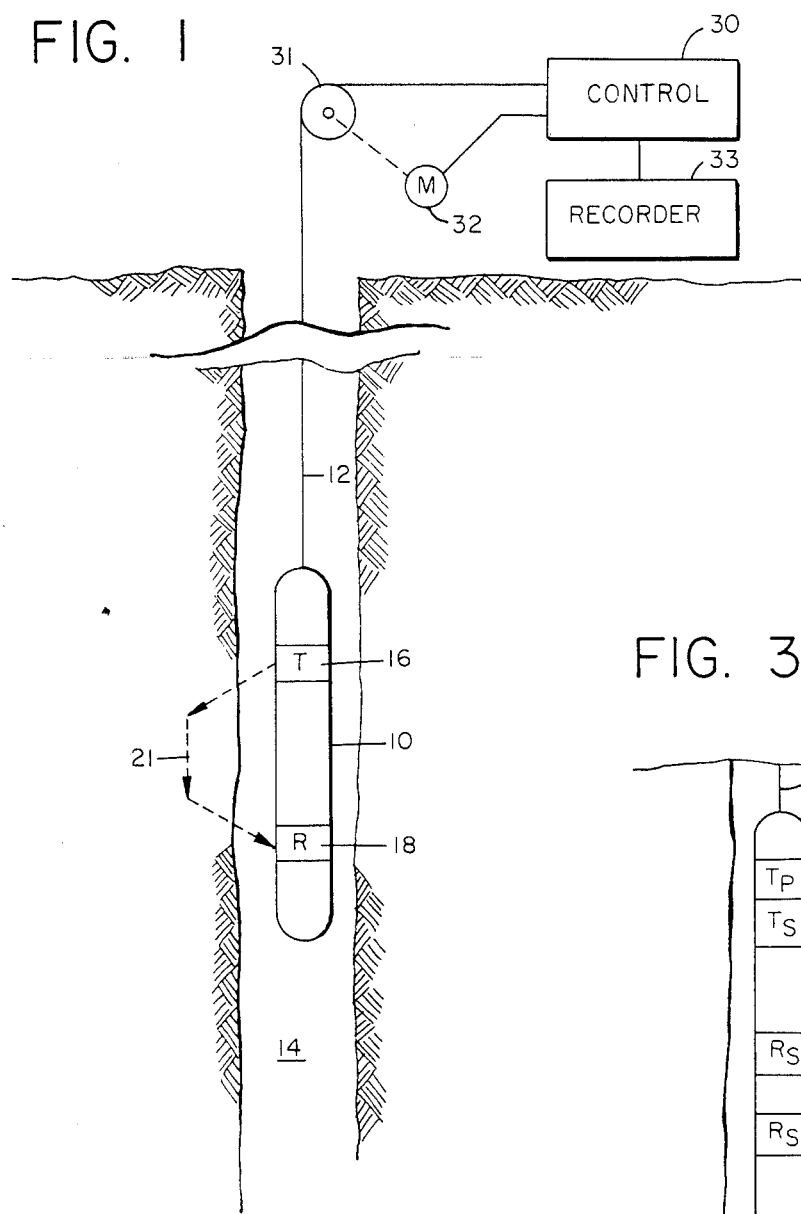
FIG. 1 is a diagramatic illustration of a well logging system employed to measure acoustic energy transmission through subsurface formations adjacent a borehole.
Figure 2:
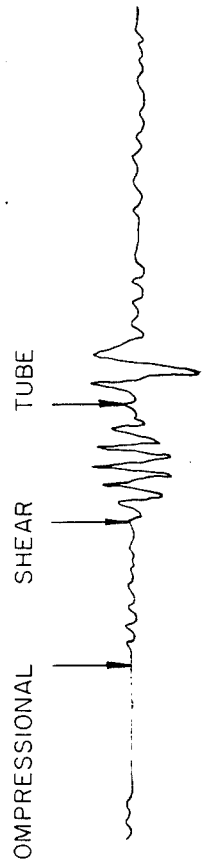
FIG. 2 illustrates a typical acoustic waveform that might be recorded by the well logging system of FIG. 1.

The method of the present invention may be carried out by means of a conventional acoustic borehole logging system. The simplest acoustic logging system consists of a single transmitter and receiver as illustrated in FIG. 1. The logging tool 10 is suspended by cable 12 for movement along the length of the borehole 14. The logging tool includes an acoustic source or transmitter 16 for the production of repetitive time-spaced pulses of acoustic energy. An acoustic detector or receiver 18 senses each of the generated acoustic pulses and converts them into representative electrical signals. An exemplary signal output of detector 18 is illustrated in FIG. 2. The waveform of FIG. 2 is shown to comprise a wavetrain, including several separately identifiable events. The uphole components include a surface control panel 30 to which the cable 12 is directed over the sheave 31. A motor 32, which is controlled from the surface control panel 30, operates the sheave 31 for raising and lowering the logging tool 10 in the borehole 14. An output means, such as a digital recorder 33, is electrically connected to the surface control panel for recording and/or displaying the date detected from the logging tool 10.

A first arriving event is the compressional wave which represents acoustic energy which has been refracted through the formation adjacent the wellbore as, for example, by way of path 21. The compressional wave travels as a fluid pressure wave in the wellbore mud from the transmitter to the formation where it travels at the compressional wave velocity of the particular formation. The compressional wave then travels to the receiver through the wellbore mud as a fluid pressure wave.

The second arriving event is the shear wave which is also refracted by way of path 21 through the formation adjacent the wellbore. Unlike the compressional wave, the shear wave travels at shear velocity through the formations. The particles of the formation along the path of propagation are vibrated in a direction perpendicular to the direction of the propagation of the wave.

The third arriving event is the tube wave which causes a radial bulging and contraction of the borehole and its travel is, therefore, associated with the borehole wall, that is, the boundary between the borehole fluids and the formation solids.

A more preferred embodiment of the acoustic logging tool of FIG. 1 that has been successfully utilized is described in U.S. Pat. No. 4,383,308 to R. C. Caldwell, such logging tool being illustrated herein in FIG. 3. Briefly, the logging tool 40 includes a compressional wave transmitter 41, a shear wave transmitter 42, a pair of spaced-apart shear wave receivers 43 and 44, and at least a pair of spaced apart compressional wave receivers 45 and 46. It is preferable that such receivers have a low frequency response of between 0.1 kHz and 30 kHz. The use of multiple transmitters and receivers is to better distinguish between the compressional, shear and tube waves which are often difficult to distinguish by the use of a single receiver. Since travel time differentials increase with increasing distance from the transmitter source, wave fronts which are closely spaced at single receiver locations will separate by the time of their receipt at remote receiver locations. Various techniques for collecting and analyzing compressional, shear and tube wave data are more completely described in U.S. Pat. Nos. 3,333,238 (Caldwell), 3,362,011 (Zemanek, Jr.) and Re. 24,446 (Summers).

Recently, attention has been directed to developing transmitters which are particularly suited to shear wave logging. Such transmitters generally attempt to achieve a single point force application of sound energy to the borehole wall. The theory behind point force transmitters, as generally outlined in "A New Method of Shear-Wave Logging", *Geophysics,* Vol. 45, No. 10 (Oct. 1980), pp. 1489–1506, by Choro Kitsunezaki, is that they are capable of directly generating shear waves. Conventional multidirectional transmitters are said to be capable only of indirectly creating shear waves. Point force type transmitters produce shear waves of substantially higher amplitudes than heretofore possible with conventional multidirectional compression wave transmitters. Accordingly, formations, such as loosely consolidated or unconsolidated sand, which do not propagate shear waves in sufficient amplitudes to permit definitive detection using conventional compression wave receivers, may now be shear wave logged with these shear wave logging systems. Canadian Pat. No. 1,152,201 (Angona and Zemanek, Jr.) describes a shear wave acoustic logging system employing such a point force transmitter for the shear wave generation.

Figure 3:
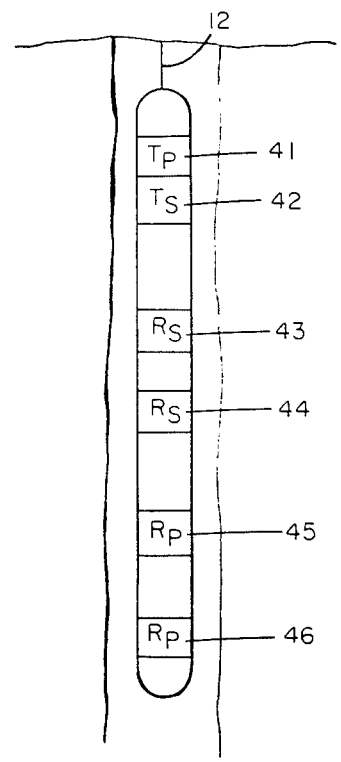
FIG. 3 illustrates a downhole logging sonde employing a plurality of acoustic transmitters and acoustic receivers for use in the well logging system of FIG. 1.

Having set forth above alternate borehole logging systems of FIGS. 1 and 3, as well as in the above-referenced U.S. patents, the method of the present invention for use of acoustic wave recordings from such systems to identify permeability in naturally fractured subterranean formations will now be described.

Initially, a naturally fractured formation is identified. One method for such identification is to measure the attenuation of shear waves through the naturally fractured zones as compared to adjacent non-fractured zones. In naturally fractured zones, the shear wave attenuation increases. Therefore, a change in the ratio of shear wave amplitudes recorded at various depths in the borehole as the logging tool is advanced through the borehole can be used to identify a naturally fractured zone.

Figure 4:
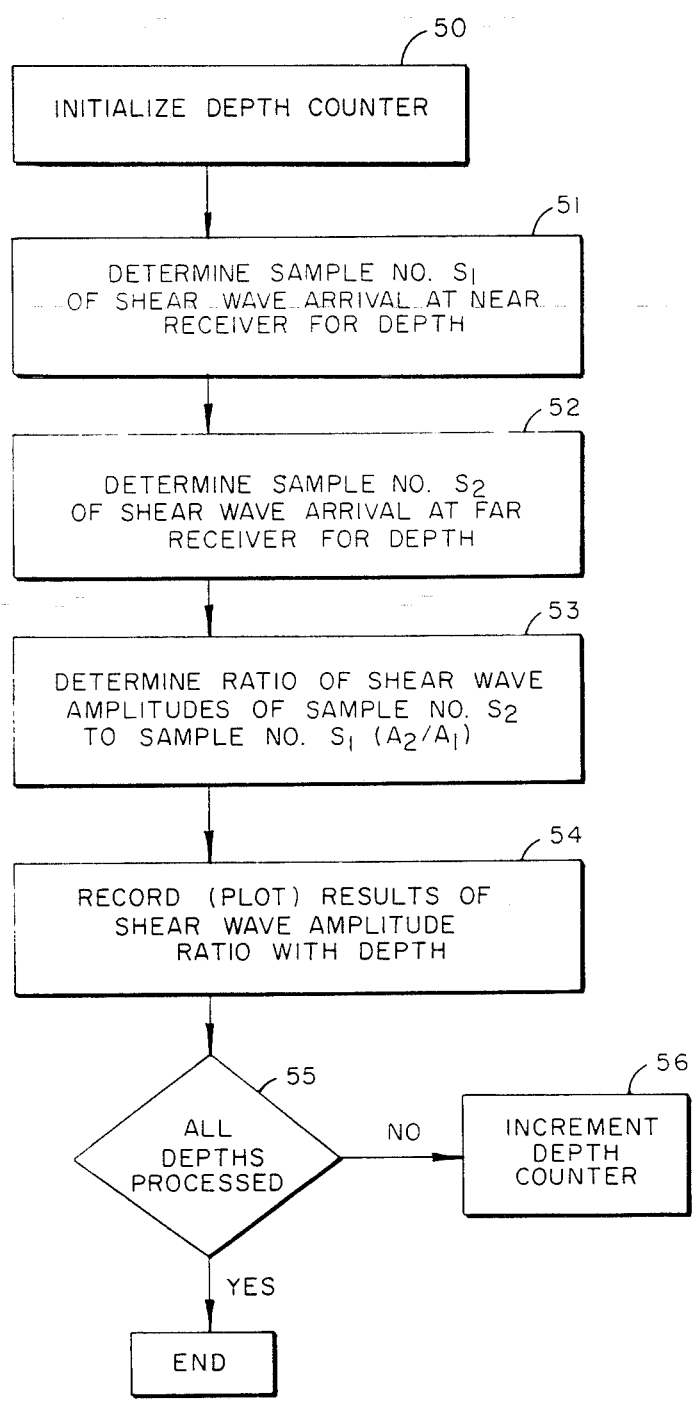
FIG. 4 is a processing flowchart of shear wave amplitude ratio measurement.

A processing flowchart is shown in FIG. 4 for a computer program implementation of shear wave amplitude ratio measurement. In the first step 50, a depth counter is initialized, after which, in step 51, the digital sample number $S_1$ of the shear wave arrival at the near receiver 43 is determined. Following this, in step 52, the sample number $S_2$ of the shear wave arrival at the far receiver 44 is determined. The amplitude ratio of the samples is taken in step 53 for the area of the borehole between receivers 43 and 44 for the selected depth. This tube wave amplitude ratio is plotted versus depth in step 54. A determination is made at step 55 whether all depth samples have been processed and, if not, the depth counter is incremented in step 56 so that steps 51 through 55 are repeated until all depth samples are processed, producing a log of shear wave amplitude ratio versus depth.

Other conventional methods are also available for identifying naturally fractured zones. One commonly used method is to run a borehole televiewer log, as set forth in U.S. Pat. No. 3,369,626 to Zemanek, Jr. The borehole televiewer log is a visual record of the physical condition of the borehole wall being traversed by an acoustic logging system. Reflected acoustic energy is detected and recorded uphole on a cathode ray oscilloscope. The sweep of the cathode ray beam is initiated by a geographical sensing device in the downhole tool so as to correlate the rotational position of the beam with the received data. The cathode ray beam is moved as a function of depth relative to a recording medium to produce a picture of the borehole wall structure.

Having identified the location of a naturally fractured formation, both the total permeability and the matrix permeability for such formation are determined. The difference between such permeabilities is the permeability that can be attributed to the naturally occurring fractures.

Referring firstly to the total formation permeability, the compressional wave transmitter 41 is pulsed as the logging tool 40 traverses the borehole. Acoustic energy is detected at receivers 45 and 46, digitized and recorded to identify tube wave arrivals. For a recorded wavetrain of 10 milliseconds, for example, an appropriate time window on the order of 0.5 milliseconds around the expected arrival times of the tube waves is selected and the tube wave arrival times within this window are sampled and digitized. The integrated peak to trough amplitude in this window is determined for each of the pair of receivers. The ratio of the tube wave amplitude detected by the receivers is observed for each of the plurality of samples taken along the borehole. This tube wave amplitude ratio reacts to the in-situ permeability of the naturally occuring fractures in the formation as well as matrix permeability. Therefore, changes in such a ratio provides a measure of total permeability of the logged formation.

Figure 6:
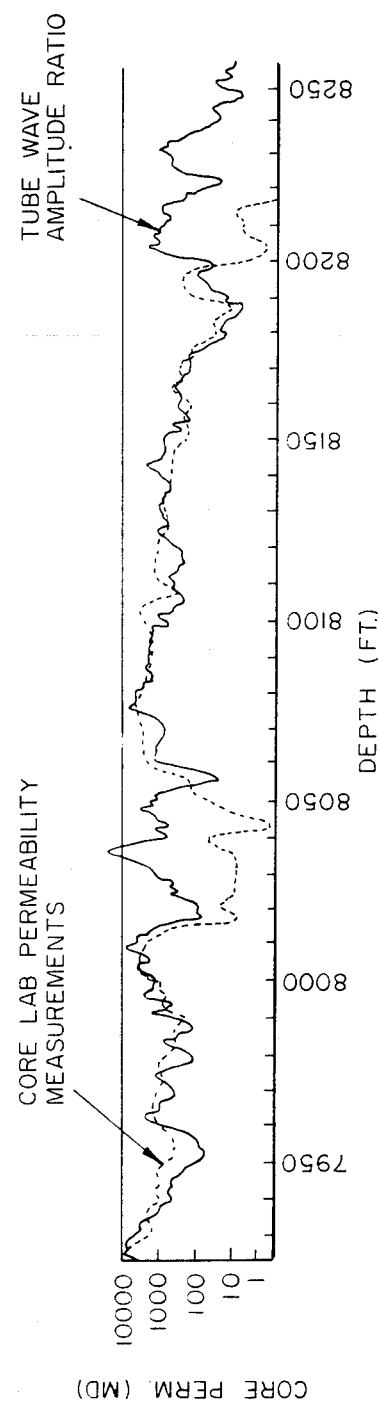
FIG. 6 is a plot illustrating correlation between measured tube wave amplitude ratio and core permeability.
Figure 5:
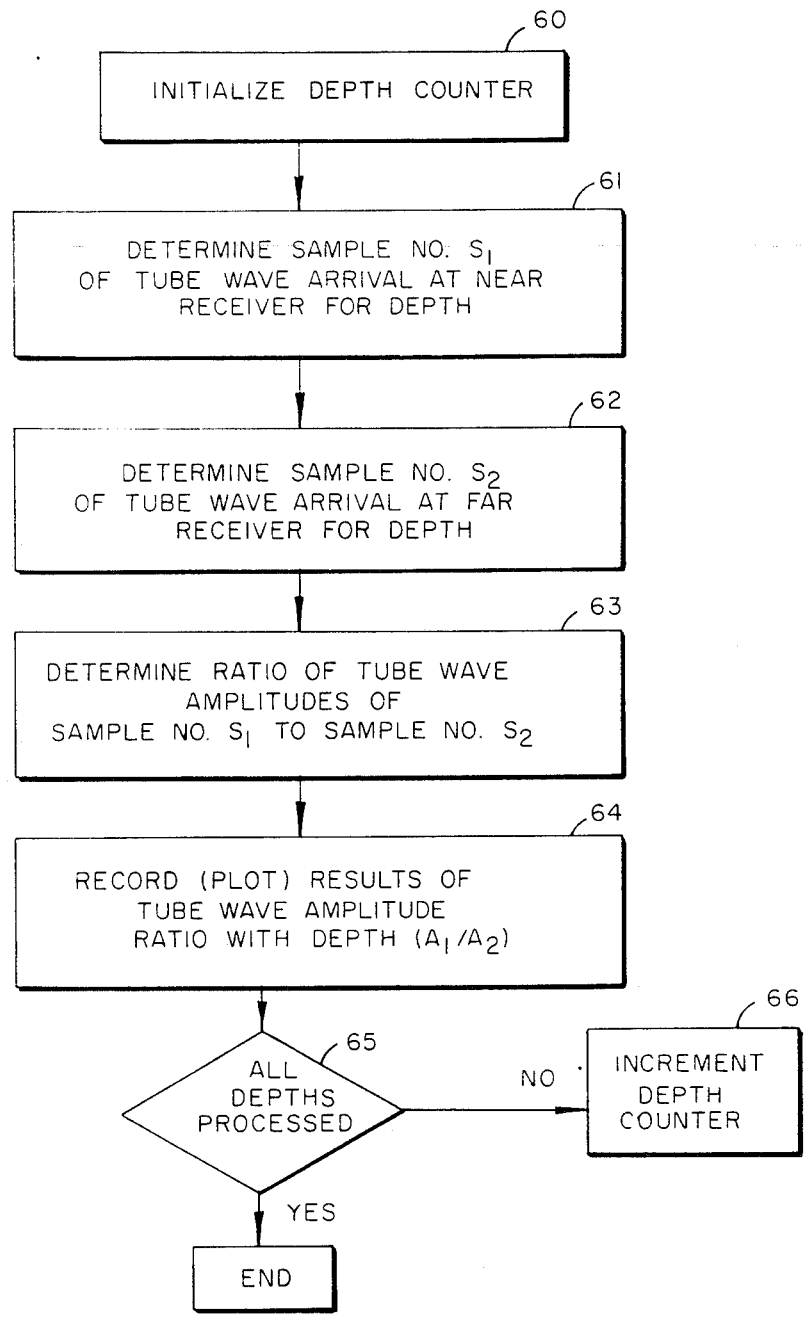
FIGS. 5 and 7 are processing flowcharts of tube wave amplitude ratio measurement.

A processing flowchart is shown in FIG. 5 for a computer program implementation of tube wave amplitude ratio measurement. In the first step 60, a depth counter is initialized, after which, in step 61, the digital sample number $S_1$ of the tube wave arrival at the near receiver 45 is determined. Following this, in step 62, the sample number $S_2$ of the tube wave arrival at the far receiver 46 is determined. The amplitude ratio of the samples is taken in step 63 for the area of the borehole between receivers 45 and 46 for the selected depth. This tube wave amplitude ratio is plotted verses depth in step 64. A determination is made at step 65 whether all depth samples have been processed and, if not, the depth counter is incremented in step 66 so that steps 61 through 65 are repeated until all depth samples are processed, producing a log of tube wave amplitude ratio versus depth. An exemplary log showing correlation of tube wave amplitude ratio with a logarithm recording of actual core permeability measurements is shown in FIG. 6. The solid line represents a log of measured tube wave amplitude ratio for the selected window around the tube wave arrival, while the dashed line is a logarithm representation of measurements from side wall core permeability samples at those intervals. As can be seen, there is a considerable degree of correlation between tube wave amplitude ratio and permeability.

Figure 7:
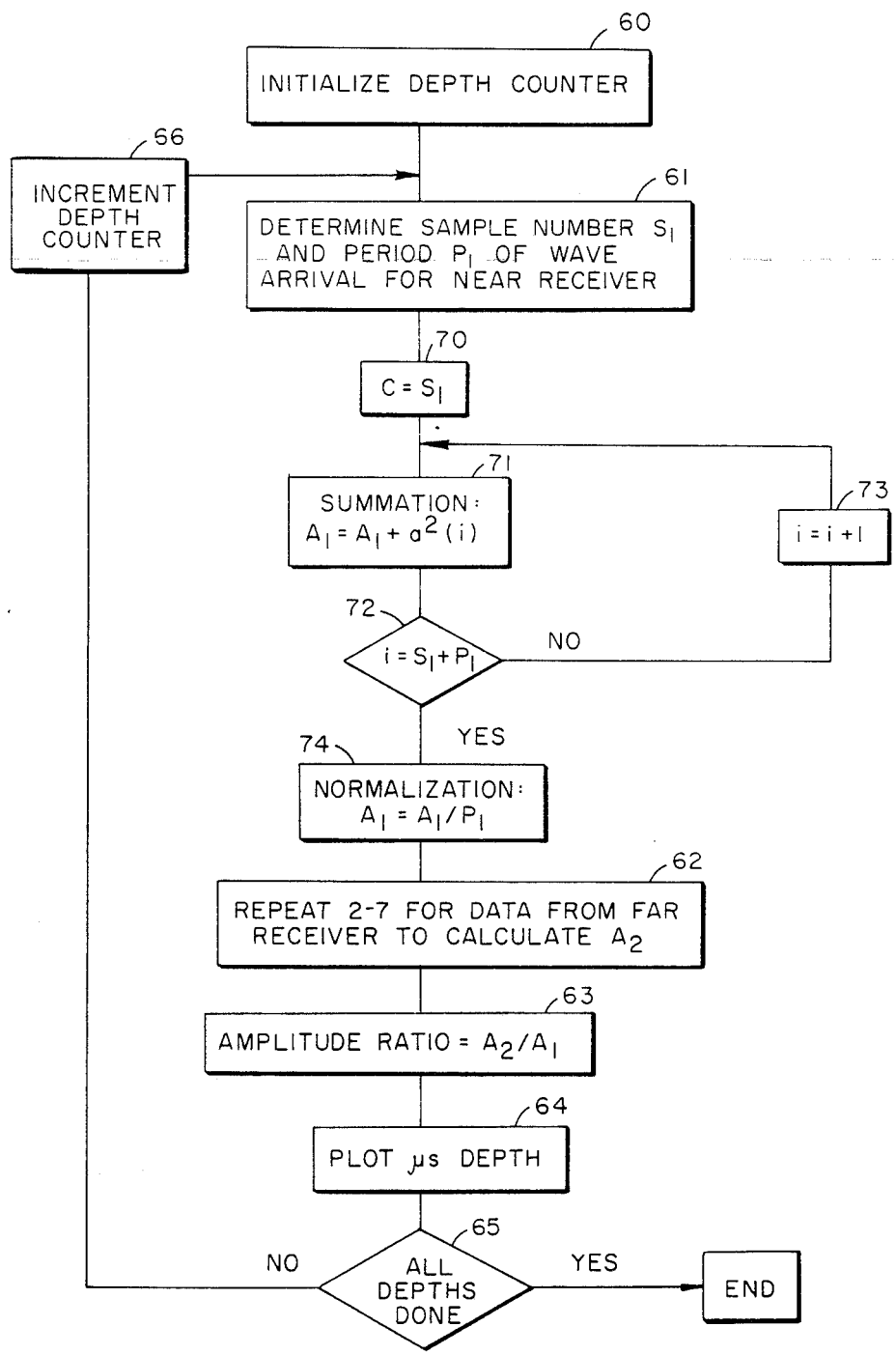

A more detailed flow chart illustrating the tube wave amplitude ratio determination is shown in FIG. 7. Steps 60-66 of FIG. 7 correspond with steps 60-66 shown in FIG. 5. The additional steps 70-74 illustrate in more detail the steps for calculating as normalized tube wave amplitude value for both the near and far receivers. These steps involve the summing of the squares of all the sample values in the sample period, from $i = S_1$ to $i = S_1 + P_1$, where:

i = sample
 $S_1$ = sample number
 $P_1$ = period of tube wave
 a = value of sample i
 $A_1$ = amplitude for near receiver
 $A_2$ = amplitude for far receiver.

Referring secondly to the formation matrix permeability of the logged formation, it has been found that the travel time of tube waves is not sensitive to naturally occurring fractures as is tube wave amplitude, but is sensitive only to the matrix permeability, rather than the total formation permeability. The difference in arrival times of acoustic energy at the spaced-apart receivers provides an indication of tube wave travel time or inversely, velocity, which correlates with and provides a measure of matrix permeability.

This relationship between tube waves and matrix permeability is based on the fact that the tube wave causes fluid displacement from the borehole into a formation when the tool is opposite to a zone of permeability. An increase in matrix permeability causes an increase in both the amount of fluid displacement as well as the amount of energy dissipated by the tube wave in moving the fluid. Empirical studies show that the tube wave velocity is dependent on the bulk properties of the solid and has a particular sensitivity to the permeability of the matrix. Accordingly, measurements of tube wave travel time, or conversely velocity, can provide a qualitative indication of high and low matrix permeability zones.

When digitizing the received wavetrains, successive samples of the analog wavetrain are taken for each receiver, with each sample being assigned a numerical sample number. The digitized wavetrains of the two receivers are then processed to compute tube wave travel time as follows:

$$D_{tube}(dj) = \frac{[I_{tube}(r_{far},dj) - I_{tube}(r_{near},dj)]*S}{D} \quad (1)$$

where, $D_{tube}(dj)$ = tube wave travel time at depth dj in us/ft;
 dj = depth where the jth waveform is recorded;
 $I_{tube}(r_{far},dj)$ = the digital sample number at the onset, i.e., arrival of the tube wave in the wavetrain recorded by the far receiver 46 at depth dj;
 $I_{tube}(r_{near},dj)$ = the digital sample number at the onset, i.e., arrival, of the tube wave in the wavetrain recorded by the near receiver 45 at depth dj;
 S = sample rate in seconds; and
 D = distance between receivers in feet.

By continuously computing and plotting $D_{tube}$ for each depth dj traversed by the logging tool, a log of tube wave travel time, or conversely velocity, can be produced.

Figure 8:
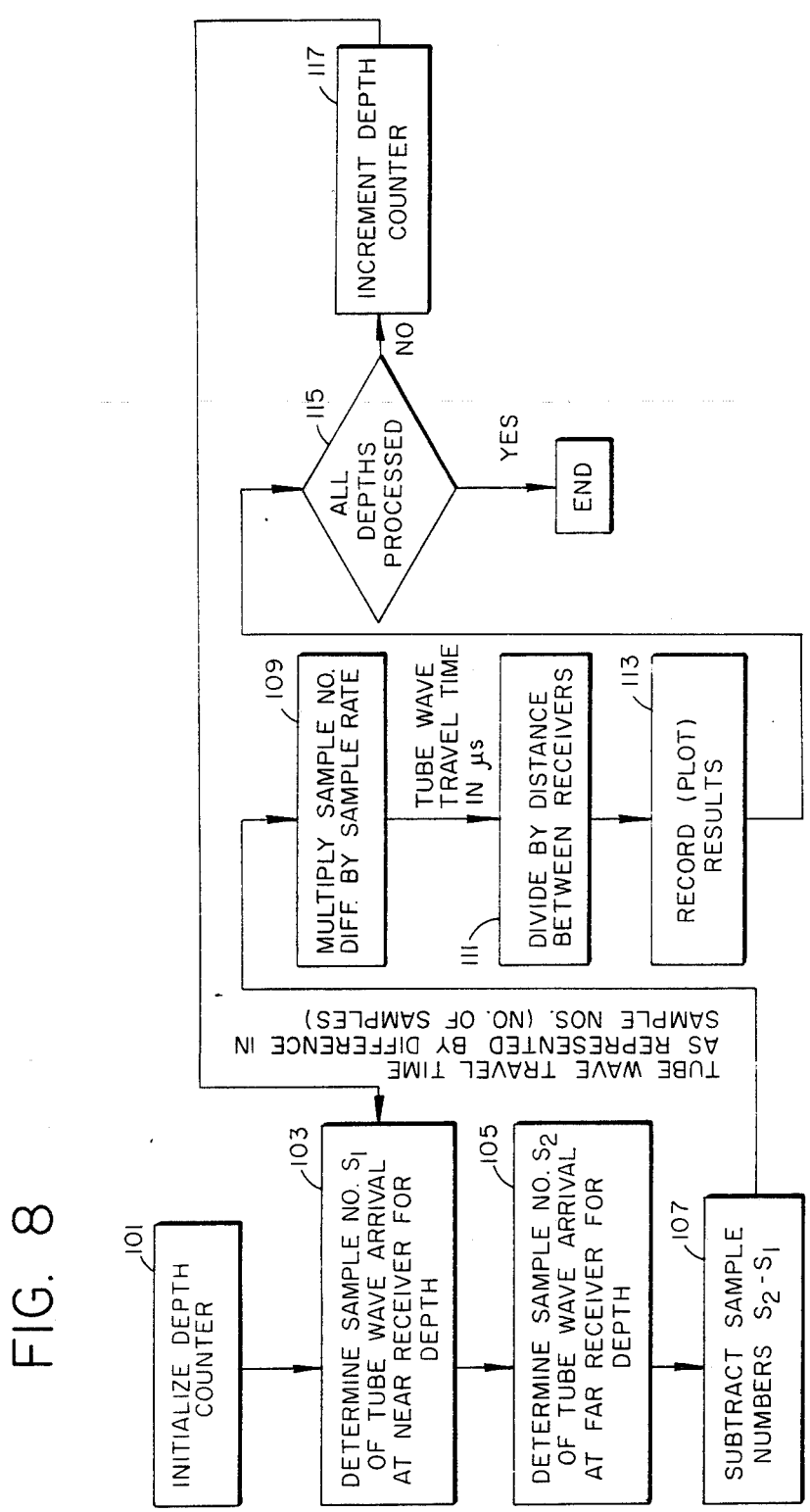
FIG. 8 is a processing flowchart of tube wave travel time ratio measurement.

A processing flowchart is shown in FIG. 8 for a computer program implementation of the tube wave travel time measurement. In the first step 101, a depth counter dj is initialized, after which, in step 103, the digital sample number $S_1$ of the tube wave arrival at the near receiver 45 for a depth dj is determined. Following this, in step 105, the sample number $S_2$ of the tube wave arrival at the far receiver 46 is determined for depth dj. The sample numbers are then subtracted ($S_2 - S_1$) in Step 107 to yield a numerical value corresponding to the tube wave travel time in the area of the borehole between receivers 45 and 46 for a depth dj. The numerical value is then multiplied, in step 109, by the sample rate (microseconds per sample) to yield a tube wave travel time in micoseconds. This value is then divided by the distance between receivers, in step 111, to yield an inverse velocity value in microseconds/feet, which can be plotted directly or inverted and plotted as a velocity (f/us) log value, in step 113. A determination is made, in step 115, whether all depth values dj have been processed and, if not, depth counter is incremented, in step 117, following which steps 103 through 115 are repeated until all depth values are processed, producing a record (log) of tube wave travel time (or velocity) versus depth.

Figure 9:
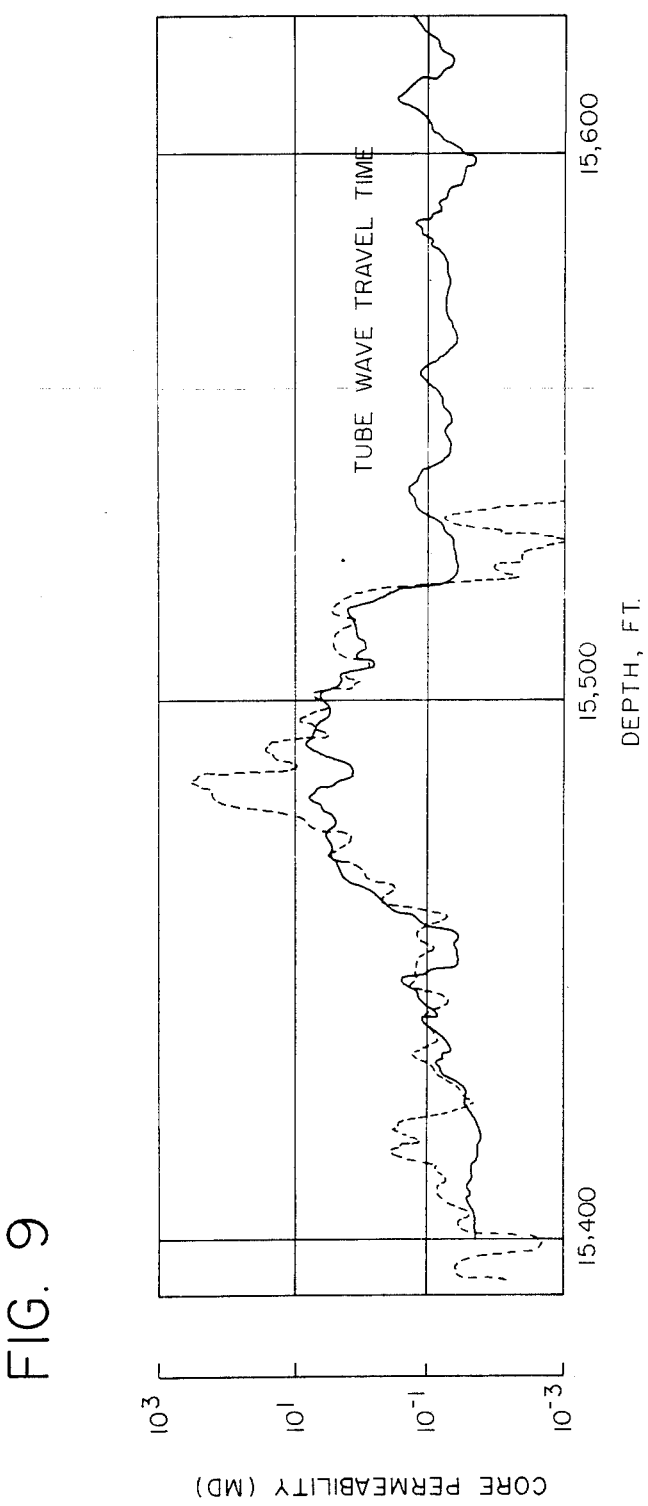
FIG. 9 is a plot illustrating correlation between measured tube wave travel time ratio and core permeability.

An exemplary log showing correlation of tube wave travel time dj with a logarithm recording of actual core permeability measurements is shown in FIG. 9. The solid line represents a log of measured tube wave travel time, while the dashed line is a logarithm representation of actual core measurements. The ordinate indicates formation permeability in millidarcies (MD). As can be seen, there is a considerable degree of correlation between measured tube wave travel time and actual formation permeability.

The determination of tube wave travel time or velocity is easily accomplished by a simple straightforward calculation based on digital sample numbers, the sampling frequency, and the distance between receivers, without requiring complicated processing.

Having determined both the total formation permeability from the tube wave amplitude ratio and the matrix permeability from the tube wave travel time, that portion of the total formation permeability that can be attributed to the naturally occurring fractures, i.e., fracture permeability, is the difference between such total formation and matrix permeabilities.

In a yet further aspect of the invention, the per foot fracture porosity $\phi$ of the naturally fractured formation can be estimated from the permeability that has been attributed to such formation. Fracture porosity is the ratio of the fracture volume to the total formation volume. Assuming an infinite fracture length, such fracture porosity $\phi$ can be expressed as the ratio of the fracture width to the formation width. For each foot of formation width, the fracture width in inches can be expressed as:

$$W = \sqrt{2k} \times 10^{-4} \qquad (3)$$

where
k = permeability in Darcies
W = fracture width in inches
Using the approximation:

$$\phi_F = \frac{\text{volume of fracture}}{\text{bulk volume}} = \frac{W}{12} \times \frac{\text{Area}}{\text{Area}} = \frac{W}{12} \qquad (4)$$

fracture porosity per foot $\phi$ can be expressed as:

$$\phi = \sqrt{2k}/12 \times 10^{-4}. \qquad (5)$$

with k = permeability in Darcies.

I claim:
1. A method for distinguishing between total subsurface formation permeability and that portion of such permeability that is attributable to naturally occurring fractures in subsurface formations adjacent a borehole, comprising the steps of:
 (a) identifying the location of at least one naturally fractured subsurface formation adjacent a borehole,
 (b) traversing a borehole along the identified location of a naturally fractured subsurface formation with a logging tool having a means for transmitting low frequency acoustic energy,
 (c) pulsing said transmitting means as the logging tool traverses said borehole to produce acoustic energy therein,
 (d) recording the amplitude and travel time relationships of tube waves detected by a pair of spaced-apart receivers within said logging tool as said logging tool traverses said identified location of a naturally fractured subsurface formation,
 (e) estimating the total permeability of said naturally fractured subsurface formation in accordance with a predetermined correlation between permeability and said recorded tube wave amplitude relationship,
 (f) estimating the matrix permeability of said naturally fractured subsurface formation in accordance with a predetermined correlation between permeability and said recorded tube wave travel time relationship, and
 (g) identifying that portion of said estimated total permeability that is attributable to the naturally occurring fractures in the subsurface formations adjacent said borehole by the difference between said estimated total permeability and said estimated matrix permeability.

2. The method of claim 1 wherein the step of estimating said total permeability of said identified naturally fractured subsurface formations from said recording of tube wave amplitude relationship of said pair of spaced-apart receivers is in accordance with a predetermined correlation established between recordings of permeability taken from core samples adjacent a naturally fractured subsurface formation in a select borehole and the relationship of tube wave amplitudes measured across said naturally occurring fractures by a pair of spaced-apart receivers in said select borehole.

3. The method of claim 2 wherein said predetermined correlation includes the plottings of the logarithm of said core permeability measurements and said tube wave amplitude relationship versus depth in said selected borehole.

4. The method of claim 3 wherein said step of recording the amplitude relationship between tube waves detected by said pair of spaced-apart receivers includes the recording of the ratio of the tube wave amplitudes of said pair of spaced-apart receivers versus depth within the borehole.

5. The method of claim 1 wherein the step of estimating said matrix permeability of said identified naturally fractured subsurface formations from said recording of tube wave travel time relationship of said pair of spaced-apart receivers is in accordance with a predetermined correlation established between recordings of permeability taken from core samples adjacent a naturally fractured subsurface formation in a select borehole and the ratio of tube wave travel times measured across said naturally occurring fractures by a pair of spaced-apart receivers in said select borehole.

6. The method of claim 5 wherein said predetermined correlation includes the plottings of the logarithm of said core permeability measurements and said tube wave travel time relationship versus depth in said selected borehole.

7. The method of claim 6 wherein said step of recording the travel time relationship of tube waves between said pair of spaced-apart receivers includes the recording of the difference of the tube wave travel times between said pair of spaced-apart receivers versus depth within the borehole.

8. The method of claim 1 wherein the step of identifying the location of at least one naturally fractured subsurface formation adjacent a borehole comprises the steps of:
 (a) recording the amplitude relationship of shear waves detected by a second pair of spaced-apart receivers within said logging tool as said tool traverses said borehole, and (b) identifying the depth of a naturally fractured subsurface formation when there is a change in the recorded amplitude relationship between the shear waves detected by said second pair of spaced apart receivers.

9. The method of claim 8 wherein said step of recording the amplitude relationship of shear waves detected by said second pair of spaced-apart receivers includes the recording of the ratio of the shear wave amplitudes of said second pair of spaced-apart receivers versus depth within the borehole.

10. The method of claim 1 further including the step of estimating fracture porosity per foot of formation in accordance with the following:

$$\phi = \sqrt{2k} / 12 \times 10^{-4},$$

where
$\phi$ = fracture porosity per foot of formation, and
$k$ = fracture permeability.

11. A method for distinguishing between total subsurface formation permeability and that portion of such permeability that is attributable to naturally occuring fractures in subsurface formations adjacent a borehole, comprising the steps of:

(a) traversing a borehole with a logging tool having a means for transmitting low-frequency acoustic energy, (b) pulsing said transmitting means at a plurality of locations in said borehole to produce acoustic energy therein, (c) detecting for each location said produced energy at a first pair of spaced-apart receivers having a low frequency response in the range 0.1 kHz to 30 kHz to detect shear waves in said acoustic energy, (d) detecting for each location said produced energy at a second pair of spaced-apart receivers having a low frequency response in the range of 0.1 kHz to 30 kHz to detect tube waves in said acoustic energy, (e) recording the amplitude ratio of shear waves detected by said first pair of spaced-apart receivers for each location versus depth within the borehole, (f) identifying the depth of natural fractures in said subsurface formations adjacent said borehole when there is a change in the recorded amplitude ratio of said shear waves detected by said first pair of spaced-apart receivers for each location, (g) recording the amplitude ratio of tube waves detected by said second pair of spaced-apart receivers for each location versus depth within the borehole, (h) recording the travel time difference of tube waves detected by said second pair of spaced-apart receivers for each location versus depth within the borehole, (i) estimating the total permeability of said identified naturally fractured subsurface formation in accordance with a predetermined correlation between permeability and tube wave amplitude ratio established by plotting both the logarithm of core permeability measurements and tube wave amplitude ratio measurements from a select borehole having a known naturally fractured formation adjacent thereto versus depth in said select borehole, (j) estimating the matrix permeability of said identified naturally fractured subsurface formation in accordance with a predetermined correlation between permeability and tube wave travel time differences established by plotting both the logarithm of core permeability measurements and tube wave travel time ratio measurements from said select borehole versus depth in said select borehole, and (k) distinguishing between total permeability and that portion of said total permeability that is attributable to the naturally occurring fractures by determining the difference between said total permeability estimate and said matrix permeability estimate.

* * * * *